United States Patent [19]

Keske

[11] 4,012,555
[45] Mar. 15, 1977

[54] SELF-BONDING VARNISH FOR MAGNET WIRES COMPRISING A COMBINATION OF A POLYALKYLENETRIMELLITATE IMIDE AND A POLYALKYLENETRIMELLITATE ESTER IMIDE

[75] Inventor: Robert G. Keske, Naperville, Ill.

[73] Assignee: Standard Oil Company (Indiana), Chicago, Ill.

[22] Filed: Feb. 23, 1976

[21] Appl. No.: 660,713

[52] U.S. Cl. .............................. 428/383; 260/75 N; 260/78.3 R; 260/326 R; 260/857 PA; 427/116; 427/118; 427/120; 428/377; 428/379; 428/458

[51] Int. Cl.² .................. B32B 15/08; C08G 78/16; C08L 79/08; H01B 3/30

[58] Field of Search ..... 260/857 PA, 75 N, 78.3 R, 260/326 R; 428/379, 383, 458, 377; 427/116, 118, 120

[56] References Cited

UNITED STATES PATENTS

| | | | |
|---|---|---|---|
| 3,668,175 | 6/1972 | Sattler | 260/75 N |
| 3,697,471 | 10/1972 | Schmidt et al. | 260/75 N |
| 3,852,246 | 12/1974 | Schmidt et al. | 260/75 N |
| 3,880,812 | 4/1974 | Golinkin et al. | 260/75 N |
| 3,917,892 | 11/1975 | Kawaguchi et al. | 428/383 |
| 3,944,706 | 3/1976 | Czajka | 428/458 |

*Primary Examiner*—J.C. Cannon
*Attorney, Agent, or Firm*—William H. Magidson; Arthur G. Gilkes; William T. McClain

[57] ABSTRACT

Mixtures of polyalkylenetrimellitate imides and polyalkylenetrimellitate ester imides suitable for use as self-bonding varnish coatings for magnet wire.

14 Claims, No Drawings

SELF-BONDING VARNISH FOR MAGNET WIRES COMPRISING A COMBINATION OF A POLYALKYLENETRIMELLITATE IMIDE AND A POLYALKYLENETRIMELLITATE ESTER IMIDE

This invention relates to mixtures of polyalkylenetrimellitate imides and polyalkylenetrimellitate ester imides and their use as self-bonding magnet wire varnishes.

Magnet wire is an essential element of many electrical components, such as armatures, stators, coils, etc. Typically, the bare magnet wire is insulated by coating with one or more layers of a magnet wire enamel. N.E.M.A. standards require that the insulating enamel layer must be flexible and thermally stable under the conditions of use and that the coated wire must have specific mechanical properties. The thermal rating of magnet wire enamels is normally determined by ASTM D-2307 (1968). Magnet wire components used in small appliances and under the hood of automobiles generally require relatively high thermal ratings and correspondingly the most expensive enamels. Accordingly, various types of enamels are employed depending upon the thermal properties required by the end use. The enameled magnet wire is fabricated into the desired electrical component, dipped into a varnish and the varnish heat fused. The varnish is necessary to hold the wound magnet wire in place in the electrical component and enhances to some extent the insulating value of the finished component.

There has been considerable interest in avoiding the relatively time consuming varnish dipping step. Accordingly, industry would like self-bonding magnet wire varnishes where (1) the varnish can be applied directly to the unwound enameled magnet wire, (2) the varnish layer provides a tack-free top coating on the enameled wire which maintains its integrity during fabrication (winding, assembly, etc.), (3) the varnished wire passes the N.E.M.A. standards for enameled wire and (4) the varnish layer can be heat fused after fabrication to form essentially the same unitary electrical components as the prior art process. The advantage of a self-bonding varnish is apparent when one considers the speed at which the wire can be coated with varnish as opposed to dipping and handling numerous fabricated parts.

Self-bonding epoxy varnishes have been developed. However, these epoxy varnishes are limited to end uses having a rating of 130° C or below. Above about 130° C, the epoxy breaks down. In commonly assigned application Ser. No. 493,558 of Czajka, filed Aug. 1, 1974, and now U.S. Pat. No. 3,944,706, poly(ethylenetrimellitate imides) are disclosed as suitable self-bonding magnet wire varnishes for class 155 rated (class F) enamels or higher rated enamels. While the poly(ethylenetrimellitate imide) varnishes of Czajka have excellent properties, the coatings have a tendency to surface craze on elongation of the coated wire. Further, there has been some interest in top coat varnishes similar to the Czajka polymers which bond to a unitary structure at somewhat lower temperatures. In commonly assigned application Ser. No. 660,716 of Keske et al, filed on even date herewith, there is described a new class of self-bonding poly(alkylenetrimellitate ester imide) coatings based on the reaction product of a trimellitic acid compound, a glycol and an aliphatic diprimary amine. While these coatings, particularly those based on reaction products of trimellitic acid compound, ethylene glycol and aliphatic diamine, do not have a tendency to craze on elongation of a coated wire, the products based on ethylenediamine have a higher bonding temperature than the Czajka polymer. The products based on higher diprimary amines, such as hexamethylenediamine, bond to unitary structures at somewhat lower temperatures. However, these coatings have the disadvantage that the bond strength of the varnished magnet wire decreases undesirably at higher temperatures. In substance, there is a trade off between bonding temperature of the varnished wire vs. the strength of the bond at higher temperatures. The lower the bonding temperature, the lower the temperature at which the bond can be subsequently broken. Accordingly, there is a need for self-bonding varnishes which can be bonded at a lower temperature than the aforesaid polyethylenetrimellitate imides of the Czajka patent but maintain their bond strength at a higher temperature than the poly(alkylenetrimellitate ester imides) of the Keske et al invention (particularly those based on ethylene glycol and hexamethylenediamine). There is also a need for self-bonding varnishes of the Keske et al type which do not have a tendency to craze on elongation of the coated wire.

The general object of this invention is to provide a new class of polymer compositions suitable for use as self-bonding magnet wire varnishes. The specific object is to provide magnet wire bearing a self-bonding varnish top coat for polyester, polyester imide, polyimide and polyamide imide enamel subbing layers. Other objects appear hereinafter.

We have now found that the objects of this invention can be attained by utilizing mixtures of polyalkylenetrimellitate imides of Golinkin et al. U.S. Pat. No. 3,880,812, which is incorporated by reference, and the polyalkylenetrimellitate ester imides of application Ser. No. 660,716 filed on even date herewith, which is incorporated by reference, wherein the two polymers are used in a weight ratio of about 1:19 to 19:1. Blends of these polymers, particularly mixtures of polyethylenetrimellitate imides based on the condensation of an N-hydroxyethyltrimellitate imide and polyalkylenetrimellitate ester imides based on ethylene glycol and hexamethylenediamine can be applied directly to enameled or subbed magnet wire and dried to a non-tacky coating without subsequent aesthetically undesirable crazing. The magnet wire coated with the compositions of this invention pass the N.E.M.A. standards and the varnish bonds on heating the fabricated elements to a unitary structure. The compositions can be formulated to bond at a lower temperature than the Czajka polymer and retain their bond strength at a higher temperature than the corresponding top coat varnishes of the Keske et al application filed on even date based on ethylene glycol and hexamethylenediamine.

For the purpose of this invention the I.V. (inherent viscosity) of the polymer is measured at 25° C and 0.5% w/v in 60/40 w/w phenol/1,1,2,2-tetrachloroethane.

The poly(alkylenetrimellitate ester imides) useful in this invention can be represented by the repeating unit

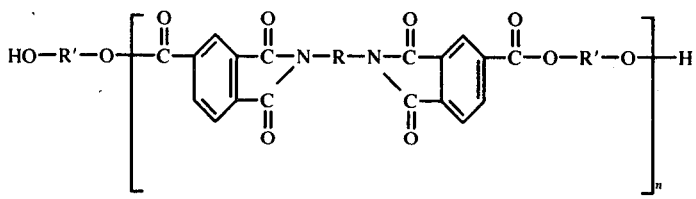

wherein R and R' are independently one or more alkylene groups of 2 to 12 carbon atoms (ethylene, propylene, hexamethylene, dodecamethylene, etc.) and $n$ is a number sufficient to provide a polymer having an I.V. of at least 0.3 dl/g.

The poly(alkylenetrimellitate ester imides) of this invention have an I.V. (inherent viscosity) of at least 0.3 dl/g, preferably at least 0.4 dl/g. If the I.V. is below 0.3, the coating lacks physical properties and the varnished magnet wire cannot be processed easily.

In general, the poly(alkylenetrimellitate ester imides) can be produced by reacting a trimellitic acid compound (trimellitic anhydride or trimellitic acid) with one or more aliphatic diprimary amines and one or more aliphatic glycols. The aliphatic glycol component and aliphatic amine component should each be used in a concentration of at least one half-mole per mole of trimellitic acid compound. In general, it is preferable to use an excess of glycol over theoretical since the vicinal acyl groups of the trimellitic acid compound react preferentially with the primary amino groups to form imide groups and any excess primary amino groups react with the non-vicinal carboxylic acid group of the trimellitic acid compound in competition with the hydroxy group of the aliphatic glycol. If excess diamine is used, an amide-imide ester-imide copolymer is formed. Accordingly, the particular mole ratios of these reactants are not critical to the production of the desired poly(alkylenetrimellitate ester imides) provided there is approximately a 1:2 mole ratio of diamine to trimellitic acid compound. All of the reactants can be condensed simultaneously at about 90° to 290° C and the unreacted glycol and diamine distilled off. If desired, the bis-imide can be formed in the first step as described in Bolton et al U.S. Pat. No. 3,051,724, which is incorporated by reference, and glycol reacted with the bisimide at 90° to 290° C. In order to maintain the reactants in a fluid condition, it is usually desirable to carry out the reaction in the presence of a tertiary amine, such as triethylamine or tripropylamine. In any case, the reaction is terminated after the polymer reaches an I.V. of at least 0.3, preferably 0.4, provided the condensation system permits attainment of the desired I.V.

The reaction can be carried out in the presence of a suitable esterification catalyst such as antimony trioxide, antimony tributoxide, tetrabutyl titanate, tetra-isopropyl titanate, stannous salts, such as stannous laurate and various organotin compounds, such as dibutyltin maleate, dibutyltin dilaurate, dibutyltin diacetate, tributyltin adipate, dibutyltin salicylate, dibutyltin dichloride, etc. All of these catalysts can be used in concentration of about 0.01 to 2 parts by weight (preferably 0.1 to 0.5 parts by weight) per 100 parts by weight of the reactants.

The aliphatic glycols useful to produce the poly(alkylenetrimellitate ester imides) of this invention include ethylene glycol, 1,2-propylene glycol, trimethylene glycol, tetramethylene glycol, dodecamethylene glycol, etc. Of these, ethylene glycol is preferred since it provides polymers having a somewhat harder finish. Further, in view of its lower molecular weight, excess ethylene glycol can be removed from the reaction mixture more readily than the higher molecular weight glycols as the reaction is completed. Other things being equal, the more carbon atoms in the alkylene glycol the lower the bonding temperature of the polymer and the lower the N.E.M.A. rating of the polymer.

The aliphatic diprimary amines useful in this invention include ethylenediamine, 1,2-diaminopropane, 1,3-diaminopropane, 1,4-diaminobutane, 1,6-diaminohexane, 1,12-diaminododecane, etc. Other things being equal as the chain length of the diamine increases, the melting point of the polymer decreases, the heat fusion temperature of the polymer decreases and the N.E.M.A. rating of the polymer decreases.

Hexamethylenediamine/ethylene glycol products are preferred for use with polyethylenetrimellitate imide since they lower the bonding temperature of the composition. Ethylenediamine/ethylene glycol products are preferred for use with poly(alkylenetrimellitate imides) based on higher alkanol amines, such as propanolamine, hexanolamine, etc., since, in this case the poly-(alkylenetrimellitate imide) lowers the bonding temperature of compositions based on ethylenediamine/ ethylene glycol poly(alkylenetrimellitate ester imides).

If desired two or more glycols and/or diamines can be used to vary the physical properties of the poly(alkylenetrimellitate ester imides). The polyalkylenetrimellitate imides based on the polymerization of N-hydroxyalkyltrimellitatic acid imide must have an I.V. of at least 0.3 dl/g, preferably 0.4 dl/g in order to provide the desired physical properties in the top coat varnish. These polymers have the following structure

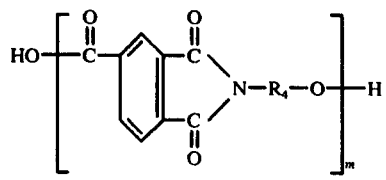

wherein $R_4$ is an alkylene group of 2 to 12 carbon atoms and $m$ is an integer. The poly(alkylenetrimellitate imides) can be produced by polymerizing N-hydroxyalkyltrimellitic acid imides in the presence of a suitable catalyst as described in Golinkin et al U.S. Pat. No. 3,880,812 which is incorporated by reference.

Suitable N-hydroxyalkyltrimellitic acid imides useful for producing the poly(alkylenetrimellitate imides) include N-hydroxyethyl trimellitic acid imide, N-hydroxypropyltrimellitic acid imide, N-hydroxybutyltrimellitic acid imide, N-hydroxyhexyltrimellitic acid imide, N-hydroxyoctyltrimellitic acid imide, etc. These monomers can be homopolymerized or two or more monomers copolymerized. If desired the N-hydroxyalkyltrimellitic acid imide can be copolymerized with up to 25 mol percent of one or more comonomers capable of reacting as if it had both terminal acyl functionality and —XH functionality wherein X stands for —O— or

Suitable comonomers of this type include amino acids, such as aminoacetic acid, aminohexanoic acid, aminobenzoic acid, etc.; lactams, such as caprolactam, etc.; lactones, such as beta-propiolactone, caprolactone, etc.; hydroxycarboxylic acids such as salicylic acid, glycollic acid, etc.; half-esters of dicarboxylic acids and glycols, such as the half-ester of ethylene glycol and maleic anhydride, etc.

N-hydroxyethyltrimellitic acid imide is the preferred imide for use in this invention and preferably comprises at least 90 mol percent of the mer units in the polymer. Polymers produced from this imide have the best balance of physical properties for use in the top coat varnishes of this invention.

The catalysts useful to produce the poly(alkylenetrimellitate imides) include antimony trioxide, antimony tributoxide, tetrabutyl titanate, tetraisopropyl titanate, stannous salts, such as stannous laurate and various organotin compounds, such as dibutyltin maleate, dibutyltin dilaurate, dibutyltin diacetate, tributyltin adipate, dibutyltin salicylate, dibutyltin dichloride, etc. Of these, the organotin salts and stannous salts of mono and dicarboxylic acids are the most versatile. For example, the antimony catalysts are not very effective in solid state polymerization, while the tin and titanate catalysts can be used advantageously in both states. The tin catalyst have the advantage over the titanate catalyst in that it is possible to produce polymers having an I.V. of up to about 0.7 dl/g in a single stage melt polymerization whereas the maximum I.V. attainable with titanate catalysts is about 0.4 dl/g in a single stage melt polymerization. The higher I.V. attainable with the tin compounds is due to the fact that higher esterification temperatures can be employed without substantial polymer degradation. This is apparently due to the tin compounds acting as stabilizers and/or having catalytic activity at higher temperatures. For example, the optimum melt polymerization temperature for the titanate catalyst is about 235° to 285° C (preferably 224° to 265° C) and for the tin catalyst 235° to 315° C (preferably 265° to 295° C). The lower temperatures yield products having the least color while the higher temperatures yield higher molecular weight polymers and/or faster reactions. The tin catalysts also permit the attainment of a second stage I.V. of 1.5 in about one-half to one-fourth the time that it takes to reach a second stage I.V. of 1.5 with the titanate catalysts. All of these catalysts can be used in a concentration of 0.01 to 2 parts by weight (preferably 0.1 to 0.5 parts by weight) per 100 parts by weight N-hydroxyalkyltrimellitic acid imide.

The N-hydroxyalkyl trimellitic acid imide can be polymerized in a one or two stage process. In either case, the N-hydroxyalkyl trimellitic acid imide is polymerized in a melt at a temperature of 225° to 340° C. In the two stage process, the solidified first stage polymer is ground or pelletized and then polymerized further at a temperature of 200° to 275° C while maintaining the polymer in a solid state. Other things being equal, the two stage process permits the production of polymers having a higher I.V. than that obtainable in a one stage process. The higher molecular weight is attainable since, the larger surface area in the second stage polymerization facilitates removal of water.

In the preferred method of producing polymers starting with alkanol amine and trimellitic acid compound, the trimellitic acid compound, preferably anhydride, is dissolved or dispersed in a suitable solvent (such as N,N-dimethylformamide) or diluent (such as water) and one mole of alkanol amine is added per mol of trimellitic acid compound. After all the alkanol amine is added, the solvent or diluent is removed, usually under vacuum. The polyesterification catalyst can be added at the same time as the alkanol amine or, if desired, after the solvent is removed. The N-hydroxyalkyltrimellitic acid imide and/or the partially condensed reactants are melt polymerized at a temperature of 200° to 315° C, preferably under vacuum. The melt polymerization is continued until the polymerization reaches an equilibrium, usually about 1 to 6 hours. The maximum first stage I.V. of (a) uncatalyzed reactions is about 0.15, (b) of titanate catalyst is about 0.4 (c) of tin catalyst about 0.7 and (d) antimony catalyst about 0.8. In general the higher the I.V. of the polymer in the first stage, the higher the polymer melting point and the easier it is to maintain the polymer in the solid state during the second stage polymerization.

Mixtures of from about 5 to 95 parts by weight of one of the aforesaid poly(alkylenetrimellitate ester imides) and correspondingly 95 to 5 parts by weight of a poly-(alkylenetrimellitate imide) described in U.S. Pat. No. 3,880,812 of Golinkin et al, which is incorporated by reference, can be utilized to balance the properties of the varnish top coat. The particular concentration of various polymeric components of the top coat varnish can be balanced in order to obtain the desired relatively low bonding temperatures without undue loss of bond strength at high temperatures. As indicated above, the bonding temperature can be controlled by employing one polymer that has a relatively high bonding temperature, such as a polyethylenetrimellitate imide or polyalkylenetrimellitate ester imide based on ethylene glycol and ethylene diamine with a polymer of the second type which bonds at a lower temperature. In the case of the polyethylenetrimellitate imides, it is preferable to employ a polyalkylenetrimellitate ester imide based on ethylene glycol and hexamethylenediamine. On the other hand when a polyalkylenetrimellitate ester imide based on ethylene glycol and ethylenediamine is employed, the polyalkylenetrimellitate imide should be based upon an alkanol amine containing at least three carbon atoms (3–12 carbon atoms). In general, as the concentration of lower bonding temperature polymer increases, the bonding temperature of the composition decreases with some sacrifice in bond strength at higher temperatures.

Substantially any one or more thermally stable magnet wire enamels can be used as subbing layers for the self-bonding varnish top coats of this invention. As indicated above, suitable subbing layers include polyesters, polyesterimides, polyamideimides, polyimides, etc.; see for example U.S. Pat. Nos. 3,022,200 of Koener, et al; 3,371,009 of Traynor, et al; 3,428,486 of George; 3,475,212 of Bach, all of which patents are incorporated by reference. A particular useful combination is to employ a polyester layer or layers directly in contact with the magnet wire and higher thermally rated enamels as the outer enamel layer. For example, it is desirable to have a polyester enamel subbing layer in direct contact with the magnet wire and either a polyimide or polyamideimide enamel layer in direct contact with the polyester layer and the top coat. Of course, each of these layers may be formed by one or more applications of the particular polymer.

The thermally stable enamels and the top coat varnishes can be applied to magnet wire by passing the wire through the polymer solution, through a suitable die and then through an oven maintained at an elevated temperature to cure and/or dry the resins on the wire. Where desired, the wire may be passed through the polymer solution and dies a number of times and through the oven after each pass through the polymer solution. In this way a thicker polymer buildup is obtainable than can be obtained with only a single pass through a polymer solution. Typically, the die provides a clearance of from about 2 to 4 mils around the wire. The speed at which the wire is passed through the polymer solution and the temperature at which the oven is maintained depends upon the particular polymer solution employed, the buildup of polymer desired, the length of the oven in which the coated wire is cured and/or dried and the molecular weight of the polymer used in the coating operation. The various parameters for applying the thermally stable enamels are well known by practitioners in this industry and particularly efficacious combinations of enamels and operating conditions can be determined by routine experimentation.

The self-bonding top coats are preferably applied from a 10 to 30 percent by weight solution of an organic solvent such as cresylic acid or meta-cresol or mixtures of these with xylenes, at a rate of 10 to 1000 feet per minute and dried at a temperature of 250° to 500° C before winding the wire and fabricating the wound magnet wire into the desired electrical component, such as a coil.

After fabrication of the electrical component, the thermoplastic top coat varnish coatings can be bonded together at a temperature of 150° to 300° C or higher for approximately 60 minutes to 5 minutes to form a unitary structure. In general, the higher the fusion temperature the shorter the heating time.

EXAMPLE I

Seventy and one-half grams homopolymeric polyethylene trimellitate imide having an inherent viscosity of 0.50 dl/g prepared in the manner described in the aforesaid Golinkin et al patent and 79.5 grams polyethylenetrimellitate ester imide based on ethylene glycol and hexamethylenediamine described in Example II of the aforesaid Keske et al application filed on even date having an inherent viscosity of 0.53 dl/g were dissolved in 450 grams cresylic acid in a 2 liter - 3-necked flask by heating at 100° C with stirring for 50 minutes. One hundred twelve grams xylene was added to the stirred solution and the solution was then filtered hot through a coarse porous plate funnel. The cooled 21% solids solution had a Gardner viscosity of 23 stokes.

Eighteen gauge (0.403 inch diameter) copper AWG wire, annealed at 750° F under nitrogen, was coated in a G.E. laboratory Model Type M Wire Tower by passing the annealed wire at 40 to 50 feet per minute through a 30% solids room temperature bath of an ethylene glycol/trishydroxyethyl isocyanurate terephthalate polyester (Isonel 200 XWE 490) in cresylic acid and dried in a two stage 15-foot oven where the first 1½ feet of the oven was maintained at 500° F and the second half of the oven was maintained at 850° F. Four coats of polyester were applied in this manner thereby increasing the wire diameter by 2.2 mils. Two layers of a trimellitic anhydride/methylenebisaniline/methylenebisaniline diisocyanate amideimide polymer of the type described in Hanson et al Application Ser. No. 348,868 filed Apr. 4, 1973, and now U.S. Pat. No. 3,847,878, which is incorporated by reference, were applied in essentially the same manner by passing the polyester coated wire through a 25% solids room temperature bath of the amideimide polymer in a 2:1 weight ratio of N-methylpyrrolidone: xylene and dried in the two stage oven at 500° and 850° F thereby increasing the enamel layer diameter an additional 0.8 mils. Two bond coats of the aforesaid mixed homopolymeric polyethylenetrimellitate imide and polyethylene-hexamethylenetrimellitate ester imide solution prepared in the preceding paragraph were applied in essentially the same manner by passing the enameled copper ware through a room temperature 21% solids bath at 45 ft/min. and dried at 500° and 850° F to increase the wire diameter 0.6 to 0.8 mils.

The magnet wire was wound, bonded at 175° C for 1 hour and tested according to N.E.M.A. magnet wire standard MW-1000-1973. Magnet wire was also coated with homopolymeric polyethylenetrimellitate imide having an inherent viscosity of 0.50 dl/g and polyethylene-hexamethylene trimellitate ester imide having an inherent viscosity of 0.53 dl/g based on ethylene glycol and hexamethylene diamine. The homopolymeric polyethylenetrimellitate was cured for one hour at 225° C while the polyethylenehexamethylene trimellitate ester imide based on ethylene glycol and hexamethylene diamine was cured at 175° C for 1 hour. The results are set forth below in Table I.

TABLE I

| Sample | Bond Strength lbs/ at | | | | |
|---|---|---|---|---|---|
| | RT | 100° C | 125° C | 150° C | 175° C |
| PETM | 23 | N.R. | N.R. | 21 | 16 |
| PETM-H | 21 | 11 | 7 | 3 | 2 |
| Composition of This Example | 14.5 | 16 | 11.5 | 6.8 | 1.5 |

In the above table PETM stands for polyethylenetrimellitate imide, PETM-H stands for polyethylenehexamethylenetrimellitate ester imide based on ethylene glycol and hexamethylenediamine and NR indicates that the sample was not tested.

The above table indicates that magnet wire coated with the composition of this invention can be bonded at a lower temperature than homopolymeric polyethylenetrimellitate imide and yet maintains its bond strength at a higher temperature than polyethylenehexamethylene trimellitate ester imide based on ethylene glycol and hexamethylene diamine. On elongation of the magnet wire coated with the polymeric composition of this invention there was no crazing.

The magnet wire coated with the polymeric composition of this invention passed the N.E.M.A. standards for Class F top coat varnishes.

When this example was repeated using a top coat varnish having a weight ratio of PETM/PETM-H of (A) 1:4.5 the bond strength was 24.5 lbs. at room temperature, 17.2 lbs. at 100° C and 6.7 lbs. at 125° C and (B) 3.5:1 the bond strength was 19.8 lbs. at room temperature, 9.3 lbs. at 100° C, 6.9 lbs. at 125° C and 7.1 lbs. at 150° C.

I claim:

1. A composition comprising a polyalkylenetrimellitate imide and a polyalkylenetrimellitate ester imide having a weight ratio of from about 1:19 to 19:1 of the respective polymers wherein said polyalkylenetrimellitate ester imide has the structure

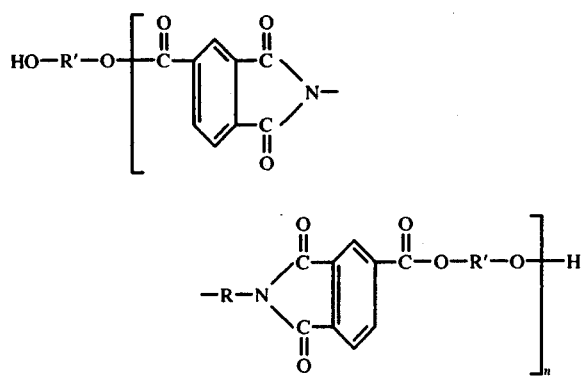

wherein each R and each R' is independently an alkylene group of 2–12 carbon atoms and $n$ is a number sufficient to provide a polymer having an I.V. of at least 0.3 dl/g.

2. The composition of claim 1, wherein each of said polymers has an I.V. of at least 0.4 dl/g.

3. The composition of claim 1, wherein R' comprises ethylene and R comprises hexamethylene.

4. The composition of claim 1, wherein the weight ratio of polyalkylenetrimellitate imide to polyalkylenetrimellitate ester imide is from 1:4 to 4:1.

5. The composition of claim 1, wherein said polyalkylenetrimellitate imide comprises a polyethylenetrimellitate imide.

6. The composition of claim 4 and wherein R' comprises ethylene and R comprises hexamethylene.

7. Magnet wire bearing a continuous self-bonding varnish top coat comprising the composition of claim 1.

8. Magnet wire bearing a continuous self-bonding varnish top coat comprising the composition of claim 2.

9. Magnet wire bearing a continuous self-bonding varnish top coat comprising the composition of claim 3.

10. Magnet wire bearing a continuous self-bonding varnish top coat comprising the composition of claim 4.

11. Magnet wire bearing a continuous self-bonding varnish top coat comprising the composition of claim 5.

12. Magnet wire bearing a continuous self-bonding varnish top coat comprising the composition of claim 6.

13. The article of claim 7 wherein said magnet wire bears at least one enamel subbing layer selected from the group consisting of polyester, polyester imide, polyimide and polyamideimide.

14. The article of claim 13 wherein a polyamideimide enamel subbing layer is in direct contact with the top coat polymer of claim 1.

* * * * *